United States Patent
Ma et al.

(10) Patent No.: US 11,348,343 B1
(45) Date of Patent: May 31, 2022

(54) VEHICLE PARKING NAVIGATION

(71) Applicant: Ford Global Technologies, LLC, Dearborn, MI (US)

(72) Inventors: Chenhao Ma, Canton, MI (US); Tony Tae-Jin Pak, Garden City, MI (US); Hamid M. Golgiri, Livonia, MI (US); Ahmed Benmimoun, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/126,309

(22) Filed: Dec. 18, 2020

(51) Int. Cl.
*G06V 20/58* (2022.01)
*G05D 1/02* (2020.01)
*B60W 30/06* (2006.01)

(52) U.S. Cl.
CPC .......... *G06V 20/586* (2022.01); *B60W 30/06* (2013.01); *G05D 1/0274* (2013.01); *G06V 20/58* (2022.01)

(58) Field of Classification Search
CPC .......... G06K 9/00812; G06K 9/00805; B60W 30/06; G05D 1/0274
See application file for complete search history.

(56) References Cited

U.S. PATENT DOCUMENTS

| | | | | |
|---|---|---|---|---|
| 2004/0020699 A1* | 2/2004 | Zalila | ................... | B62D 15/028 180/204 |
| 2005/0060073 A1* | 3/2005 | Tanaka | ............... | B62D 15/0285 701/36 |
| 2008/0033633 A1* | 2/2008 | Akiyoshi | ............... | G06Q 10/02 701/418 |
| 2011/0082613 A1* | 4/2011 | Oetiker | ................. | B60W 10/20 701/25 |
| 2014/0121883 A1* | 5/2014 | Shen | .................. | B62D 15/0285 701/28 |
| 2016/0131495 A1* | 5/2016 | Su | ...................... | G01C 21/3626 701/442 |
| 2018/0094944 A1* | 4/2018 | Su | ...................... | G01C 21/3667 |
| 2018/0244287 A1* | 8/2018 | Kirstein | ................. | G08G 1/168 |
| 2019/0251842 A1* | 8/2019 | Wunder | ............... | H04W 4/021 |
| 2020/0211391 A1* | 7/2020 | Li | ........................ | G05D 1/0212 |
| 2020/0257910 A1 | 8/2020 | Mayer et al. | | |
| 2020/0346639 A1* | 11/2020 | Tashiro | .................. | G01C 21/34 |

FOREIGN PATENT DOCUMENTS

DE 102018201111 B4 6/2020
WO 2018189076 A1 10/2018

* cited by examiner

*Primary Examiner* — Daryl C Pope
(74) *Attorney, Agent, or Firm* — Frank A. MacKenzie; Bejin Bieneman PLC (57) ABSTRACT

A sub-area in an area is identified as an authorized sub-area for a vehicle to access based on detecting a first object in the sub-area from first sensor data. Then a parameter of the first object is determined from the first sensor data. Upon detecting a second object in the sub-area from second sensor data, a parameter of the second object is determined based on the second sensor data. The sub-area is determined valid based on determining the parameter of the second object is different than the parameter of the first object.

20 Claims, 7 Drawing Sheets

VEHICLE PARKING NAVIGATION

BACKGROUND

A vehicle can be equipped with electronic and electro-mechanical components, e.g., computing devices, networks, sensors and controllers, etc. A vehicle computer can acquire data regarding the vehicle's environment and can operate the vehicle or at least some components thereof based on the acquired data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

A system includes a computer including a processor and a memory, the memory storing instructions executable by the processor to identify a sub-area in an area as an authorized sub-area for a vehicle to access based on detecting a first object in the sub-area from first sensor data. The instructions further include instructions to then determine a parameter of the first object from the first sensor data. The instructions further include instructions to, upon detecting a second object in the sub-area from second sensor data, determine a parameter of the second object based on the second sensor data. The instructions further include instructions to determine the sub-area is valid based on determining the parameter of the second object is different than the parameter of the first object.

The instructions can further include instructions to, upon determining the sub-area is valid, update a map of the area to include the valid sub-area.

The instructions can further include instructions to provide the updated map to a remote computer.

The instructions can further include instructions to, upon identifying the sub-area, update a map of the area to include the authorized sub-area.

The instructions can further include instructions to, upon detecting the valid sub-area is unoccupied from third sensor data, operate the vehicle into the valid sub-area.

The instructions can further include instructions to, upon identifying the sub-area, determine a location of the vehicle and then operate the vehicle to depart the location.

The instructions can further include instructions to obtain the second sensor data based on the vehicle returning to the location.

The instructions can further include instructions to detect the sub-area based on a map of the area.

The instructions can further include instructions to detect the sub-area based on the first sensor data.

The instructions can further include instructions to prevent the vehicle from operating into an invalid sub-area.

The instructions can further include instructions to, upon identifying the first object and the second object, determine the sub-area is valid based further on the first object being different than the second object.

Each parameter can be a dimension of the respective object.

Each parameter can be an orientation of the respective object relative to the vehicle.

The instructions can further include instructions to determine the sub-area is valid based further on a map of the area.

The system can include a remote computer including a second processor and a second memory, the second memory storing instructions executable by the second processor to update a validation of the sub-area in the map based on aggregated data including messages from a plurality of vehicles indicating the sub-area is valid.

A method includes identifying a sub-area in an area as an authorized sub-area for a vehicle to access based on detecting a first object in the sub-area from first sensor data. The method further includes then determining a parameter of the first object from the first sensor data. The method further includes, upon detecting a second object in the sub-area from second sensor data, determining a parameter of the second object based on the second sensor data The method further includes determining the sub-area is valid based on determining the parameter of the second object is different than the parameter of the first object.

The method can further include, upon determining the sub-area is valid, updating a map of the area to include the valid sub-area.

The method can further include, upon identifying the first object and the second object, determining the sub-area is valid based further on the first object being different than the second object.

Each parameter can be a dimension of the respective object.

Each parameter can be an orientation of the respective object relative to the vehicle.

Further disclosed herein is a computing device programmed to execute any of the above method steps. Yet further disclosed herein is a computer program product, including a computer readable medium storing instructions executable by a computer processor, to execute an of the above method steps.

A vehicle can operate in an area that includes a plurality of sub-areas. For example, a user may operate the vehicle in the area. As another example, a vehicle computer can operate the vehicle along a planned path in the area. While the vehicle is operating in the area, e.g., a parking area, the vehicle computer can search for available sub-areas for the vehicle to access, e.g., unoccupied parking spaces, via image data. However, the vehicle computer may be unable to identify valid (i.e., unoccupied and available) sub-areas due to, detecting e.g., sub-area markings being covered by debris, snow, leaves, etc., incomplete or duplicate sub-area markings, other vehicles parking in invalid sub-areas, etc. Advantageously, the vehicle computer can detect first and second objects in the sub-area at different times from sensor data. For example, the vehicle computer can detect the first object via one image and the second object via a temporally subsequent image. Based on comparing the parameters of the first and second objects, the vehicle computer can determine the sub-area is valid or invalid, which can prevent the vehicle computer from operating the vehicle to a stop in an invalid sub-area (e.g., reserved, legally prohibited, part of a travel lane, etc.).

Figure 1:
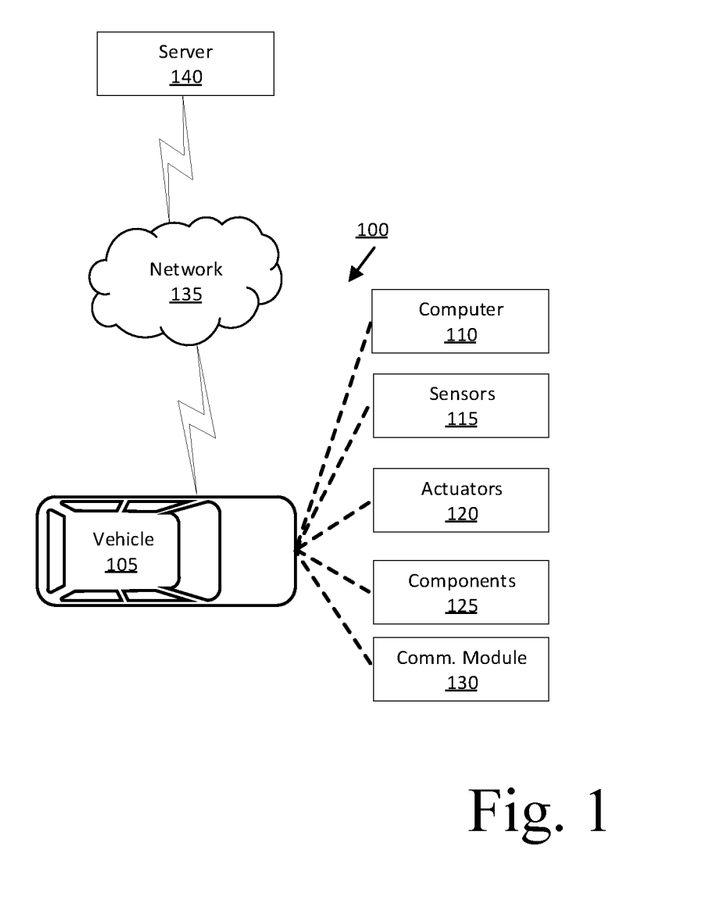
FIG. 1 is a block diagram illustrating an example vehicle control system for a vehicle.
Figure 2:
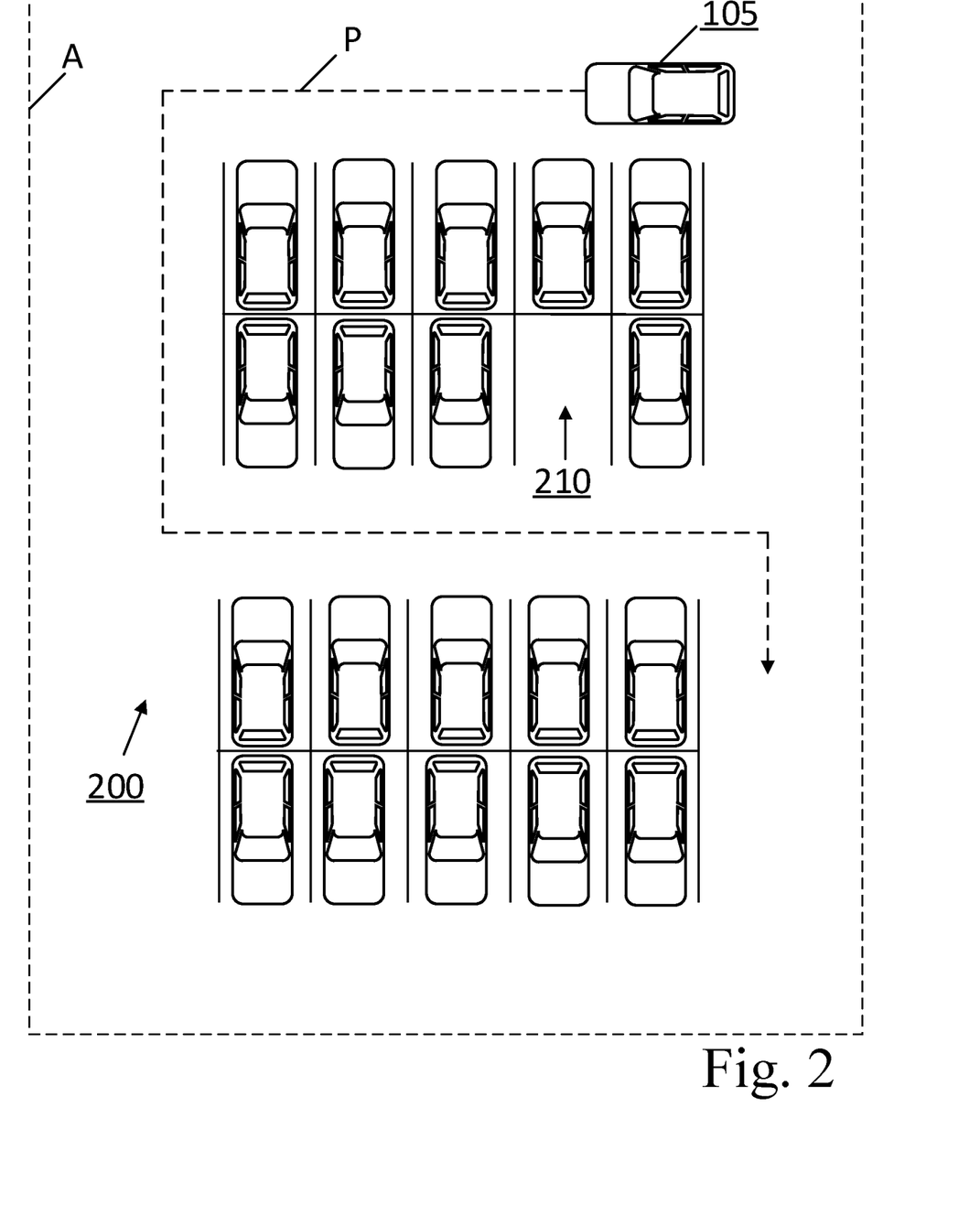
FIG. 2 is a diagram illustrating operating the vehicle according to the system of FIG. 1.

With reference to FIGS. 1-2, an example vehicle control system 100 includes a vehicle 105. A vehicle computer 110 in the vehicle 105 receives data from sensors 115. The vehicle computer 110 is programmed to identify a sub-area 210 in an area 200 as an authorized sub-area 210 for the vehicle 105 to access based on detecting a first object 220 in the sub-area 210 from first sensor 115 data. The vehicle computer 110 is further programmed to then determine a parameter of the first object 220 from the first sensor 115 data. The vehicle computer 110 is further programmed to, upon detecting a second object 225 in the sub-area 210 from second sensor 115 data, determine a parameter of the second object 225 based on the second sensor 115 data. The vehicle computer 110 is further programmed to determine the sub-area 210 is valid based on determining the parameter of the second object 225 is different than the parameter of the first object 220.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, a user device 145, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

FIG. 2 is a diagram illustrating a vehicle 105 operating in an example ground surface area 200 that includes marked sub-areas 210 (e.g., parking spaces) for vehicles. An area 200 may be on a street or road, e.g., a defined parking area alongside a curb or an edge of the street, a parking lot or structure or portion thereof, etc. The vehicle computer 110 may be programmed to determine the vehicle 105 is within the area 200 by, e.g., GPS-based geo-fencing. In such an example, the GPS geo-fence specifies a perimeter A of the area 200. The vehicle computer 110 can then determine the vehicle 105 is within the area 200 based on the location data of the vehicle 105 indicating the vehicle 105 is within the geo-fence of the area 200.

The vehicle computer 110 can, for example, generate a planned path P to operate the vehicle 105 in the area 200. Alternatively, the remote server computer 140 can generate the planned path P and then provide the planned path P to the vehicle computer 110, e.g., via the network 135. As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \qquad (1)$$

where $a_0$ an offset, i.e., a lateral distance between the path and a center line of the host vehicle 105 at the upcoming distance x, $a_1$ is a heading angle of the path, $a_2$ is the curvature of the path, and $a_3$ is the curvature rate of the path.

The planned plan P can, for example, direct the vehicle 105 along aisles or lanes along which sub-areas 210 are located in the area 200 to search for available sub-areas 210 for the vehicle 105 to access, e.g., for parking the vehicle 105. Alternatively, a user can operate the vehicle 105 to direct the vehicle 105 in the area 200, e.g., along aisles or lanes along which sub-areas 210 are located. While the vehicle 105 is operating in the area 200, the vehicle computer 110 can be programmed to detect sub-areas 210 based on image data received from camera sensors 115, e.g., via the vehicle network. A sub-area 210 may, for example, be a parking space indicated by conventional markings, e.g., painted lines on a ground surface, and conventional image recognition techniques can be employed by the vehicle computer 110 to detect the sub-area 210. As another example, the vehicle computer 110 can receive a map of the area 200, e.g., from the remote server computer 140. The map can include the sub-areas 210, and the vehicle computer 110 can detect the sub-areas 210 based on the map.

Upon detecting the sub-area 210, the vehicle computer 110 can determine a location of the vehicle 105. The vehicle computer 110 may determine the location, e.g., GPS (Global Positioning System) location coordinates, of the vehicle 105 relative to a coordinate system, e.g., based on data received from a sensor 115. Alternatively, the vehicle computer 110 can receive the location of the vehicle 105 from the remote server computer 140, e.g., via the network 135. The vehicle computer 110 can store the location, e.g., in a memory.

The vehicle computer 110 can then determine a location of the sub-area 210 based on image data obtained while the vehicle 105 is at the vehicle 105 location. For example, the vehicle computer 110 can identify an edge or boundary (or a portion of a boundary), e.g., a painted line on a ground surface, of the sub-area 210, e.g., according to image recognition techniques. The vehicle computer 110 can further determine an angle α between a line L from the camera sensor 115 lens to the identified edge of the sub-area 210 and an axis A extending from the lens parallel to a longitudinal axis of the vehicle 105 (see FIG. 3A). Then, the vehicle computer 110 can identify the sub-area 210 in the map of the area 200 based on determining the identified edge of the sub-area 210 in the map that is intersected by the line L extending from the location of the vehicle 105 and at the angle α relative to the axis A. Upon identifying the sub-area 210 in the map, the location of the sub-area 210 may be determined.

Figure 3A:
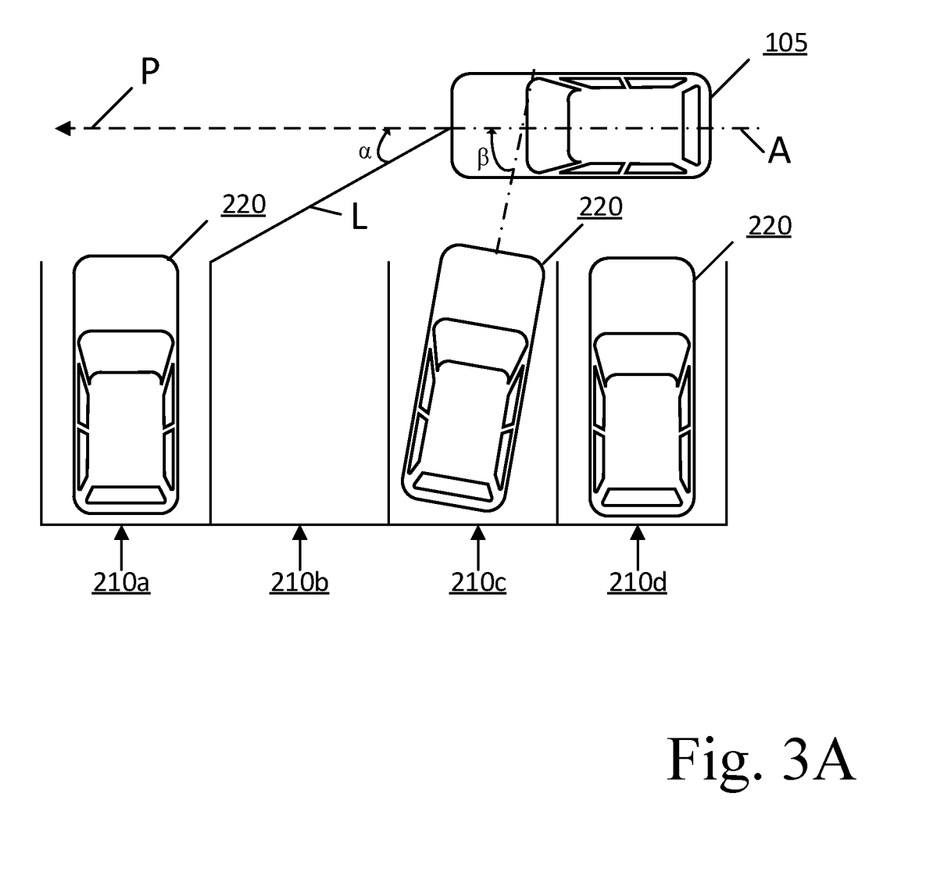
FIG. 3A is a diagram illustrating identifying authorized sub-areas at a location.
Figure 3B:
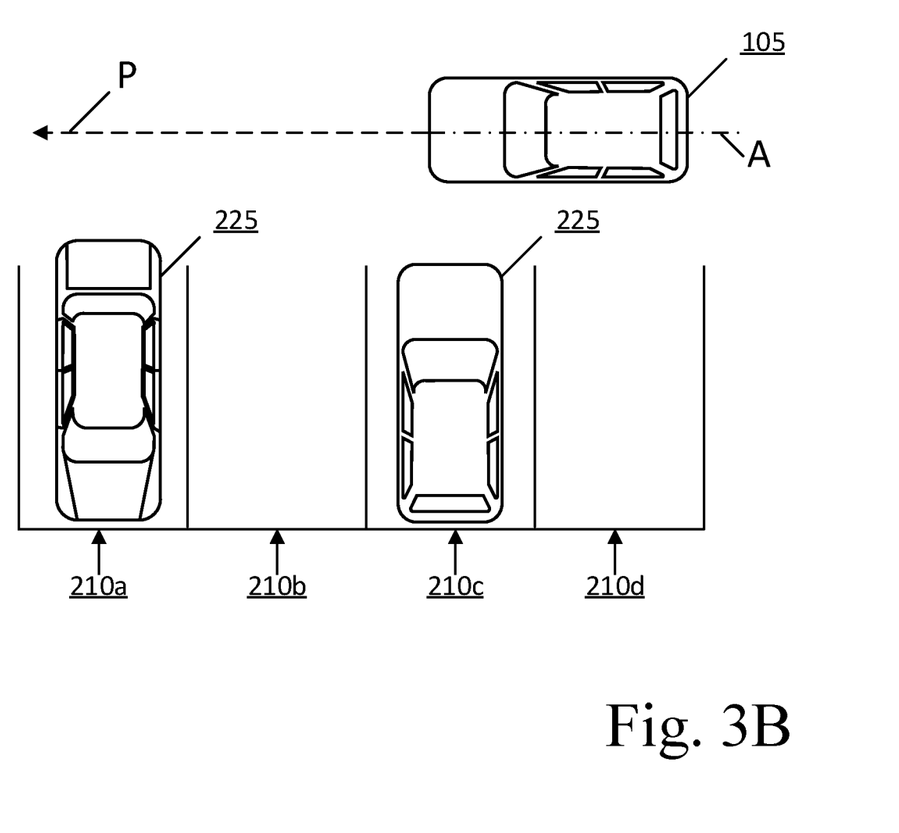
FIG. 3B is a diagram illustrating determining authorized sub-areas at the location are valid.
Figure 3C:
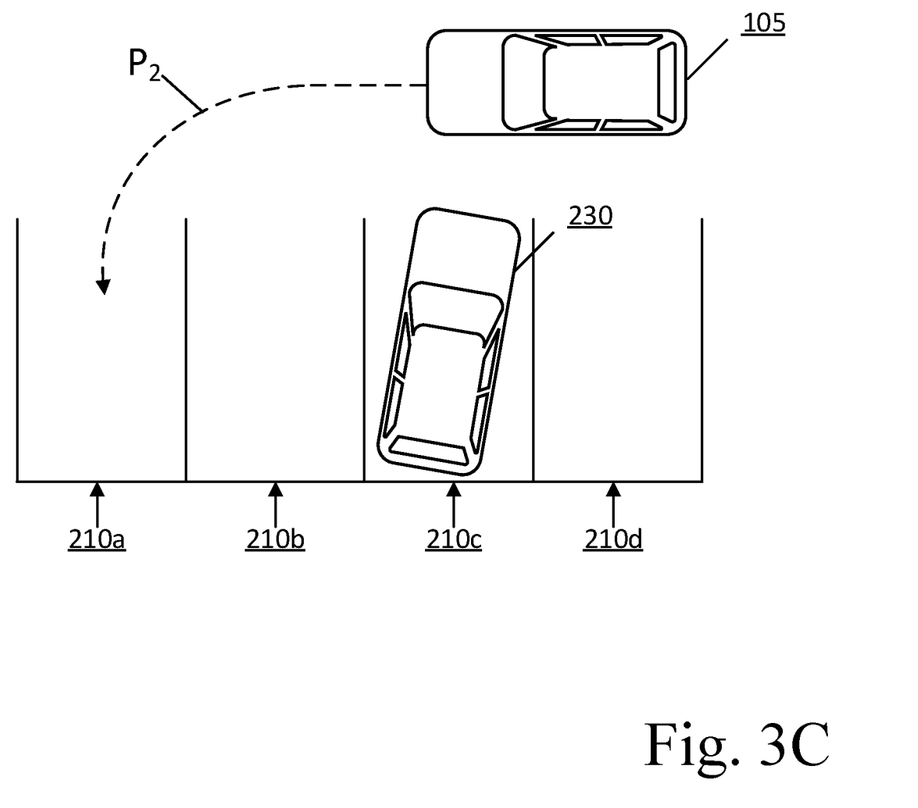
FIG. 3C is a diagram illustrating operating the vehicle into a valid sub-area at the location.

Turning now to FIGS. 3A-3C, while the vehicle 105 is operating along the planned path P, the vehicle computer 110 can detect a plurality of sub-areas 210a, 210b, 210c, 210d based on first sensor 115 data. The vehicle computer 110 can then identify each sub-area 210a, 210b 210c, 210d as an authorized sub-area 210 based on the sub-area 210a, 210c, 210d being occupied (see FIG. 3A) or as an unauthorized sub-area 210 based on the sub-area 210b being unoccupied (see FIG. 3A). That is, the vehicle computer 110 can determine a first object 220 is present in the sub-area 210, e.g., between markings of a parking space, or no first object 220 is present in the sub-area 210. A first object 220 is an object detected from first sensor 115 data. The vehicle computer 110 can receive first sensor 115 data, e.g., image data, of the environment around the vehicle 105 in the area 200. The first image data can include one or more first objects 220 around the vehicle 105 in the area 200. For example, the vehicle computer 110 can be programmed to classify and/or identify first object(s) 220 based on sensor 115 data. For example, conventional object classification or identification techniques can be used, e.g., in the vehicle computer 110 based on lidar sensor 115 data, camera sensor 115 data, etc., to identify a type of first object 220, e.g., a vehicle, a pedestrian, a drone, etc., as well as physical features of objects. Non-limiting examples of objects include a pedestrian, another vehicle, a bicycle, a shopping cart, etc.

Various techniques may be used to interpret sensor 115 data and/or to classify objects based on sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, e.g., corresponding to respective sub-areas 210a, 210b, 210c, 210d, an identification and/or a classification (i.e., movable or non-movable) of one or more objects or an indication that no object is present in the respective region of interest, e.g., corresponding to a sub-area 210a, 210b, 210c, 210d. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of objects identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

The vehicle computer 110 can be programmed to determine parameters of a first object 220 in each sub-area 210a, 210c, 210d. A parameter in this context means a measurable physical quantity, i.e., a measurement of a physical phenomenon, for a vehicle, e.g., dimensions (e.g., height, length, width), an orientation, a travel direction, a color, etc. For example, the classifier can be further trained with data known to represent various types, e.g., makes and/or models, of vehicles. Thus, in addition to identifying the first object 220 as a vehicle, the classifier can output a type of the first object 220. Once trained, the classifier can accept as input vehicle sensor 115 data, e.g., an image including the first object 220, and then provide as output an identification of the type of the first object 220 in the image. As another example, the vehicle computer 110 can determine a type of the first object 220 based on image data, e.g., by using image recognition techniques. The vehicle computer 110 can then determine dimensions of the first object 220 based on the type of the first object 220. For example, the vehicle computer 110 may store, e.g., in a memory, a look-up table or the like that associates dimensions of the first object 220 with a type of first object 220.

As another example, the vehicle computer 110 can be programmed to determine an orientation, i.e., a two-dimensional (2D) position or direction, of the first object 220 relative to the vehicle 105. For example, the vehicle computer 110 can determine the orientation of the first object 220 based on first image data including the first object 220, e.g., by using image recognition techniques. For example, the vehicle computer 110 can determine an angle β between a line extending along the longitudinal axis A of the vehicle 105 and a line extending along the longitudinal axis of the first object 220 (see FIG. 3A). The orientation of the first object 220 is determined from the angle β.

As another example, upon identifying the first object 220 as a vehicle, the vehicle computer 110 can determine a travel direction of the first object 220 relative to the planned path P of the vehicle 105, e.g., forward or backward. For example, the vehicle computer 110 can identify exterior features, e.g., headlamps, taillights, license plates, etc., on the first object 220 based on first image data including the first object 220, e.g., using image recognition techniques. In the case that the vehicle computer 110 identifies headlamps on the first object 220 (e.g., facing the planned path P of the vehicle 105), the vehicle computer 110 can determine the travel direction of the first object 220 is forward relative to the path P of the vehicle 105. In the case that the vehicle computer 110 identifies taillights and/or back-up lights (e.g., facing the planned path P of the vehicle 105), the vehicle computer 110 can determine the travel direction of the first object 220 is backward relative to path P of the vehicle 105. The vehicle computer 110 can store the parameter(s) of the first object 220, e.g., in a memory of the vehicle computer 110.

The vehicle computer 110 can continue to operate the vehicle 105 along the planned path P. That is, the vehicle computer 110 can actuate one or more vehicle components 125 to move the vehicle 105 along the planned path P to depart the location. For example, the planned path P can direct the vehicle 105 out of the area 200. As another example, the planned path P can direct the vehicle 105 in a loop around the area 200. The vehicle computer 110 can then operate the vehicle 105 to return to the location at a future time, e.g., based on looping the area 200 or returning to the area 200. For example, the vehicle computer 110 can actuate one or more vehicle components 125 to move the vehicle 105 along the planned path P and return to the location.

Upon returning to the location at the future time, the vehicle computer 110 can obtain second sensor 115, e.g., second image data. The second image data includes the environment around the vehicle 105 at the location and is obtained subsequent to the first image data. The vehicle computer 110 can determine if each of the sub-areas 210a, 210b, 210c, 210d is occupied or unoccupied based on the second image data. That is, the vehicle computer 110 can determine a second object 225 is present in the respective sub-area 210a, 210b, 210c, 210d or no second object 225 is present in the respective sub-area 210a, 210b, 210c, 210d. For example, the vehicle computer 110 can use object classification or identification techniques, as discussed above, to determine whether each sub-area 210a, 210b, 210c, 210d is occupied or unoccupied. In this context, the second object 225 is an object detected from the second sensor 115 data. The second object 225 may be the first object 220 or a different object.

The vehicle computer 110 can determine an authorization of unauthorized sub-areas 210 based on the second sensor 115 data. For example, upon detecting no second object 225 in the unauthorized sub-area 210b, the vehicle computer 110 determines the sub-area 210b remains unauthorized (see FIG. 3B). Upon detecting a second object 225 in the unauthorized sub-area 210b, the vehicle computer 110 can identify the sub-area 210b as an authorized sub-area 210, i.e., the vehicle computer 110 authorizes the sub-area 201b.

The vehicle computer 110 can determine a validation of the authorized sub-areas 210 based on the second sensor 115 data. That is, the vehicle computer 110 determines each authorized sub-area 210 is valid or invalid based on detecting a second object 225 in the respective sub-area 210. The vehicle computer 110 can determine each unauthorized sub-area 210 is invalid regardless of whether the vehicle computer 110 detects a second object 225 in the unauthorized sub-area 210 from second sensor 115 data. That is, the vehicle computer 110 may not determine unauthorized sub-areas 210 are valid.

Upon determining the authorized sub-area 210a, 210c is occupied (see FIG. 3B), the vehicle computer 110 can identify the second objects 225 in the respective sub-areas 210a, 210c. For example, the vehicle computer 110 can compare the type of the second object 225 in the sub-area 210 to the type of the first object 220 in the corresponding sub-area 210. If the type of the second object 225 e.g., a vehicle, is different than the type of the first object 220, e.g., a shopping cart, the vehicle computer 110 can validate the sub-area 210. That is, the vehicle computer 110 determines that the sub-area 210a, 210c is valid.

If the type of the second object 225 is the same as the type of the first object 220, e.g., a vehicle, then the vehicle computer 110 can determine parameters of the second object 225, e.g., in substantially the same manner as discussed above regarding the first object 220 parameters. The vehicle computer 110 can then compare the second object 225 parameters to the corresponding first object 220 parameters. If the second object 225 parameters substantially match the first object 220 parameters (e.g., the first and second objects 220, 225 are the same object, the first and second objects 220 have the same orientation relative to the vehicle 105 at the location, and the first and second objects 220, 225 have the same travel direction), then the vehicle computer 110 determines that the sub-area 210a, 210c is invalid. If the second object 220 parameters are different from the first object 220 parameters (e.g., the second object 225 is a different object than the first object 220, an orientation of the second object 225 is different than the first object 220, or a travel direction of the second object 225 is different than a travel direction of the first object 220), then the vehicle computer 110 determines that the sub-area 210a, 210c is valid (see FIG. 3B).

Additionally, or alternatively, the vehicle computer 110 can determine the sub-area 210 is valid based on the map of the area 200. For example, the map can specify that the sub-area 210 is valid or invalid based on aggregated data (as discussed below). If the map specifies that the sub-area 210 is valid, then the vehicle computer 110 can validate the sub-area 210. If the map specifies that the sub-area 210 is invalid, then the vehicle computer 110 can invalidate the sub-area 210.

Upon determining the authorized sub-area 210d is unoccupied from second sensor 115 data (see FIG. 3B), the vehicle computer 110 may maintain the authorization of the sub-area 210d. The vehicle computer 110 may, for example, maintain the authorization of the sub-area 210d until the vehicle computer 110 determines a second object 225 is in the sub-area 210d from subsequent sensor 115 data, i.e., sensor 115 data obtained subsequent to the second sensor 115 data. That is, the vehicle computer 110, may maintain the authorization of the sub-area 210d until the vehicle computer 110 can determine that the sub-area 210d is occupied by an object. In this situation, the vehicle computer 110 can determine the sub-area 210d is valid based on determining that the authorized sub-area 210d is occupied from the subsequent sensor 115 data. Alternatively, the vehicle computer 110 can deauthorize the sub-area 210d based on determining that the sub-area 210d remains unoccupied for a predetermined time period, e.g., 1 week, 1 month, etc.

The vehicle computer 110 can be programmed to update the map of the area 200, e.g., stored in the memory of the vehicle computer 110, received from the remote server computer 140, etc., to specify the authorization of each sub-area 210 within the area 200. For example, the vehicle computer 110 can update the authorization of the sub-area 210 based on detecting, from the first sensor 115 data, the first object 220 in the sub-area 210 or detecting no first object 220 in the sub-area 210. In the example shown in FIG. 3A, the vehicle computer 110 can update the map to specify the sub-areas 210a, 210c, 210d are authorized and sub-area 210b is unauthorized.

Additionally, the vehicle computer 110 can update the map to specify the validation of each sub-area 210 within the area 200. For example, the vehicle computer 110 can update the validation of the sub-area 210 based on determining the second object 225 parameters are different from the first object 220 parameters. That is, the vehicle computer 110 can update the map to specify the sub-area 210 is valid. In the example shown in FIG. 3B, the vehicle computer 110 can update the map to specify the sub-areas 210a, 210c are valid and the sub-areas 210b, 210d are invalid. The vehicle computer 110 can be programmed to reject, i.e., not select, sub-areas 210 for parking the vehicle 105 based on the sub-area 210 being invalid and/or unauthorized in the map. The vehicle computer 110 can store the updated map, e.g., in a memory of the vehicle computer 110. Additionally, or alternatively, the vehicle computer 110 can provide the updated map to the remote server computer 140.

The vehicle computer 110 can continue to operate the vehicle 105 along the planned path P. That is, the vehicle computer 110 can actuate one or more vehicle components 125 to move the vehicle 105 along the planned path P to depart the location, as discussed above. The vehicle computer 110 can then operate the vehicle 105 to return to the location at a second future time, as discussed above.

Upon returning to the location at the second future time, the vehicle computer 110 can obtain third sensor 115, e.g., third image data. The third image data includes the environment around the vehicle 105 at the location and is obtained subsequent to the second image data. The vehicle computer 110 can determine if the sub-areas 210a, 210b, 210c, 210d are occupied or unoccupied based on the third image data. That is, the vehicle computer 110 can determine a third object 230 is present in the respective sub-area 210a, 210b, 210c, 210d or no third object 230 is present in the respective sub-area 210a, 210b, 210c, 210d. For example, the vehicle computer 110 can use object classification or identification techniques, as discussed above, to determine whether the sub-areas 210a, 210b, 210c, 210d are occupied or unoccupied. In this context, the third object 230 is an object detected from the third sensor 115 data. The third object 230 may be the first object 220, the second object 225, or a different object.

Upon determining a valid sub-area 210c is occupied (see FIG. 3C), the vehicle computer 110 can operate the vehicle 105 along the planned path P to search for an unoccupied valid sub-area 210. Additionally, upon determining an invalid sub-area 210b, 210d is unoccupied (see FIG. 3C), the vehicle computer 110 may be programmed to prevent the vehicle 105 from operating into the invalid sub-area 210b, 210d. For example, the vehicle computer 110 can continue to operate the vehicle 105 along the planned path P, e.g., to search for an unoccupied valid sub-area 210.

Upon determining a valid sub-area 210a is unoccupied (see FIG. 3C), the vehicle computer 110 may be programmed to operate the vehicle 105 into the sub-area 210a. For example, the vehicle computer 110 can generate an updated planned path $P_2$ from the location to the sub-area 210a. For example, the vehicle computer 110 can then actuate one or more vehicle components 125 to operate the vehicle 105 along the updated planned path $P_2$ to a stop in the sub-area 210a. The vehicle 105 is at a stop when substantially all of the vehicle 105 is within a boundary of the sub-area 210a, e.g., between markings of a parking space, and the vehicle 105 is stationary. The vehicle computer 110 can, for example, determine substantially all of the vehicle 105 is within the boundary of the sub-area 210a by comparing the location of the vehicle 105 to the location of the sub-area 210a. As another example, the vehicle computer 110 can analyze sensor 115 data to determine the vehicle 105 is approximately centered laterally and longitudinally relative to the boundary of the sub-area 210a. The vehicle computer 110 can determine the vehicle 105 is stationary based on sensor 115 data, e.g., received from a wheel speed sensor 115 or the like.

The remote server computer 140 may be programmed to update the map of the area 200, e.g., stored in the second memory, based on aggregated data. Aggregated data means data from a plurality of vehicle computers that provide validation messages independently of one another and then combining (e.g., by averaging and/or using some other statistical measure) the results. That is, the remote server computer 140 may be programmed to receive validation messages from a plurality of vehicle computers indicating a sub-area 210 is valid based on vehicle data of a plurality of vehicles. Based on the aggregated data indicating the sub-area 210 is valid (e.g., an average number of messages, a percentage of messages, etc., indicating the sub-area 210 is valid being above a threshold), the remote server computer 140 can update the map to specify the sub-area 210 is valid based on the vehicle data. The remote server computer 140 can then transmit the map to a plurality of vehicles, including the vehicle 105, e.g., via the network 135.

Figure 4A:
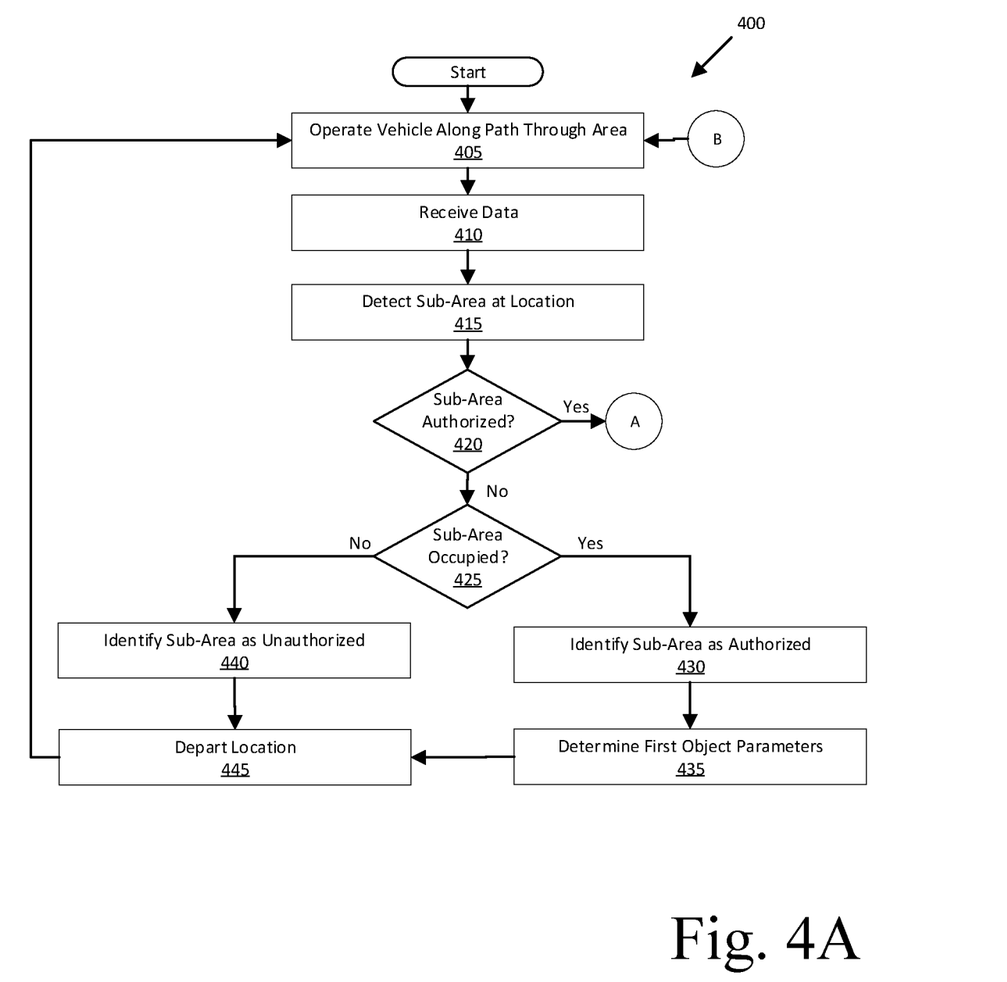
FIG. 4A is a first part of a flowchart of an example process for operating the vehicle.

FIG. 4A is a first portion of a flowchart of an example process 400 (the second portion being shown in FIG. 4B because the entire flowchart will not fit on a single drawing sheet) for operating a vehicle 105. The process 400 begins in a block 405. The process 400 can be carried out by a vehicle computer 110 included in the vehicle 105 executing program instructions stored in a memory thereof.

In the block 405, the vehicle computer 110 operates the vehicle 105 along a planned path P within an area 200. The planned path P can direct the vehicle 105 along aisles or lanes along which sub-areas 210 are located in the area 200. The vehicle computer 110 can generate the planned path P, e.g., via navigation and/or path planning algorithms, as discussed above. The process 400 continues in a block 410.

In the block 410, the vehicle computer 110 receives data from one or more sensors 115, e.g., via a vehicle network, and/or from a remote server computer 140, e.g., via a network 135. For example, the vehicle computer 110 can receive location data of the vehicle 105, e.g., from a sensor 115, a navigation system, etc., specifying a location of the vehicle 105. Additionally, the vehicle computer 110 can receive first image data, e.g., from one or more image sensors 115. The first image data may include data about the environment around the vehicle 105, e.g., the area 200, a sub-area 210, one or more first objects 220, etc. The process 400 continues in a block 415.

In the block 415, the vehicle computer 110 can detect a sub-area 210. For example, the vehicle computer 110 can detect conventional markings indicating the sub-area 210 from first sensor 115 data, e.g., by using image recognition techniques, as discussed above. Additionally, or alternatively, the vehicle computer 110 detect a sub-area 210 based on a map of the area 200, as discussed above. The vehicle computer 110 may receive the map from a remote server computer 140, e.g., via a network 135. As discussed above, the remote server computer 140 can update the map to specify authorizations and validations of each sub-area 210 within the area 200. Upon detecting the sub-area 210, the vehicle computer 110 can determine a location of the vehicle 105 based on, e.g., sensor 115 data, map data, etc., as discussed above. Alternatively, the vehicle computer 110 can receive the location of the vehicle 105 from the remote server computer 140, e.g., via the network 135. The process 400 continues in a block 420.

In the block 420, the vehicle computer 110 determines whether the sub-area 210 is identified as an authorized sub-area 210. For example, the vehicle computer 110 can determine the sub-area 210 is an authorized sub-area 210 based on the map of the area 200. If the sub-area 210 is identified as authorized sub-area 210, then the process 400 continues in a block 450. Otherwise, the process 400 continues in a block 425.

In the block 425, the vehicle computer 110 determines whether the sub-area 210 is occupied based on first sensor 115 data. That is, the vehicle computer 110 can determine a first object 220 is present in the sub-area 210 or no first object 220 is present in the sub-area 210. For example, the vehicle computer 110 can receive first sensor 115 data, e.g., image data, of the environment around the vehicle 105 in the area 200. The first image data can include one or more first objects 220 around the vehicle 105 in the area 200. For example, a classifier can be trained to accept as input vehicle sensor 115 data, e.g., an image including the first object 220, and then provide as output an identification and/or a classification of the first object 220, as discussed above. If the sub-area 210 is occupied by a first object 220, then the process 400 continues in a block 430. If the sub-area 210 is unoccupied, then the process 400 continues in a block 440.

In the block 430, the vehicle computer 110 identifies the sub-area 210 as authorized. That is, the vehicle computer 110 authorizes the sub-area 210. Upon authorizing the sub-area 210, the vehicle computer 110 can update the map of the area 200 to specify the sub-area 210 is authorized, as discussed above. The vehicle computer 110 can then provide the updated map to the remote server computer 140, which can update the map further based on aggregated data, as discussed above. The process 400 continues in a block 435.

In the block 435, the vehicle computer 110 determines parameters of the first object 220 based on the first sensor 115 data. As set forth above, a parameter means a measurable physical quantity, i.e., a measurement of a physical phenomenon, for a vehicle, e.g., dimensions (e.g., height, length, width), an orientation, a travel direction, etc. For example, the classifier can be further trained to accept as input vehicle sensor 115 data, e.g., an image including the first object 220, and then provide as output an identification of the type of the first object 220 in the image, as discussed above. The vehicle computer 110 can then determine dimensions of the first object 220 based on the type of the first object 220, as discussed above.

Additionally, or alternatively, the vehicle computer 110 can be programmed to determine an orientation of the first object 220 relative to the vehicle 105. For example, the vehicle computer 110 can determine an angle β between a line extending along a longitudinal axis A of the vehicle 105 and a line extending along a longitudinal axis of the first object 220 based on first sensor 115 data, as discussed above.

Additionally, or alternatively, upon identifying the first object 220 as a vehicle, the vehicle computer 110 can determine a travel direction of the first object 220 relative to the planned path P of the vehicle 105, e.g., forward or backward. For example, the vehicle computer 110 can identify exterior features, e.g., headlamps, taillights, license plates, etc., on the first object 220 based on first image data including the first object 220, e.g., using image recognition techniques. The vehicle computer 110 can then determine the travel direction of the first object 220 based on the identified exterior features, as discussed above. The vehicle computer 110 can store the parameter(s) of the first object 220, e.g., in a memory of the vehicle computer 110. The process 400 continues in a block 445.

In the block 440, the vehicle computer 110 identifies the sub-area 210 as an unauthorized sub-area 210. The vehicle computer 110 can then update the map to specify that the sub-area 210 is unauthorized. The vehicle computer 110 can then provide the updated map to the remote server computer 140, which can update the map further based on aggregated data, as discussed above. The process 400 continues in a block 445.

In the block 445, the vehicle computer 110 operates the vehicle 105 to depart the location. That is, the vehicle computer 110 actuates one or more vehicle components 125 to move the vehicle 105 along the planned path P away from the location. Said differently, the vehicle computer 110 prevents the vehicle 105 from accessing unauthorized sub-areas 210. For example, the vehicle computer 110 may operate the vehicle 105 to depart the area 200. The process 400 returns to the block 405.

Figure 4B:
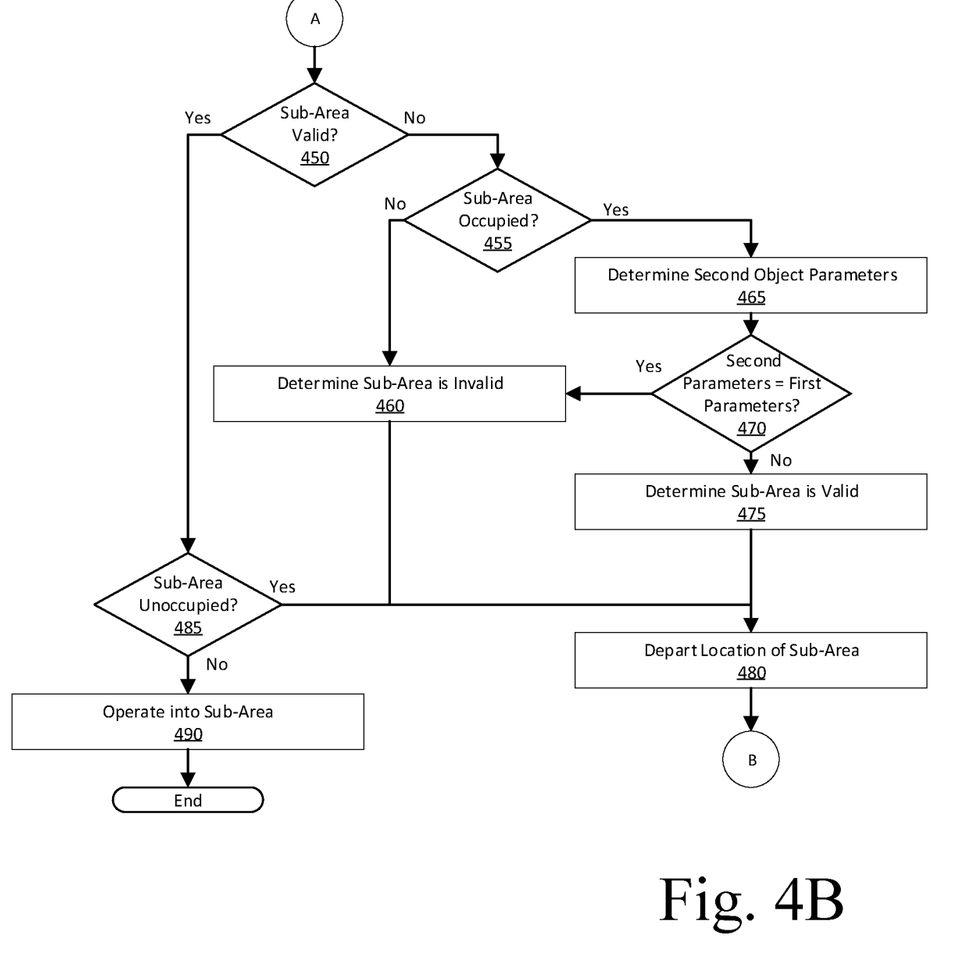
FIG. 4B is a second part of the flowchart of FIG. 4A.

Turning now to FIG. 4B, following the block 420 shown in FIG. 4A, in the block 450, the vehicle computer 110 determines whether the sub-area 210 is a valid sub-area 210. For example, the vehicle computer 110 can determine the sub-area 210 is a valid sub-area 210 based on the map of the area 200. If the sub-area 210 is a valid sub-area 210, then the process 400 continues in a block 485. Otherwise, the process 400 continues in a block 455.

In the block 455, the vehicle computer 110 determines whether the sub-area 210 is occupied based on second sensor 115 data. That is, the vehicle computer 110 can determine a second object 225 is present in the sub-area 210 or no second object 225 is present in the sub-area 210. For example, the vehicle computer 110 can receive second sensor 115 data, e.g., image data, of the environment around the vehicle 105 in the area 200. The second image data can include one or more second objects 225 around the vehicle 105 in the area 200. For example, a classifier can be trained to accept as input vehicle sensor 115 data, e.g., an image including the second object 225, and then provide as output an identification and/or a classification of the second object 225, as discussed above. If the sub-area 210 is occupied by a second object 225, then the process 400 continues in a block 465. If the sub-area 210 is unoccupied, then the process 400 continues in a block 460.

In the block 460, the vehicle computer 110 determines the sub-area 210 is invalid. The vehicle computer 110 can then update the map to specify that the sub-area 210 is invalid. The vehicle computer 110 can then provide the updated map to the remote server computer 140, which can update the map further based on aggregated data, as discussed above. The process 400 continues in a block 480.

In the block 465, the vehicle computer 110 determines parameters of the second object 225 based on second sensor 115 data. The vehicle computer 110 can determine the second object 225 parameters in substantially the same manner as discussed above in the block 435 regarding the first object 220 parameters. The process 400 continues in a block 470.

In the block 470, the vehicle computer 110 determines whether the second object 225 parameters substantially match the first object 220 parameters. For example, the vehicle computer 110 can compare the second object 225 parameters to the corresponding first object 220 parameters. If the second object 225 parameters substantially match the corresponding first object 220 parameters, then the process 400 continues in the block 460. If the second object 225 parameters are different than, i.e., do not substantially match, the corresponding first object 220 parameters, then the process 400 continues in a block 475.

In the block 475, the vehicle computer 110 determines the sub-area 210 is valid. The vehicle computer 110 can then update the map of the area 200 to specify the sub-area 210 is valid, as discussed above. The vehicle computer 110 can then provide the updated map to the remote server computer 140, which can update the map further based on aggregated data, as discussed above. The process 400 continues in a block 480.

In the block 480, the vehicle computer 110 operates the vehicle 105 to depart the location. That is, the vehicle computer 110 actuates one or more vehicle components 125 to move the vehicle 105 along the planned path P away from the location. Said differently, the vehicle computer 110 prevents the vehicle 105 from accessing invalid sub-areas 210. For example, the vehicle computer 110 may operate the vehicle 105 to depart the area 200. The process 400 returns to the block 405.

In the block 485, the vehicle computer 110 determines whether the sub-area 210 is occupied based on third sensor 115 data. For example, the vehicle computer 110 can receive third sensor 115 data, e.g., image data, of the environment around the vehicle 105 in the area 200. The third image data can include one or more third objects 230 around the vehicle 105 in the area 200. For example, a classifier can be trained to accept as input vehicle sensor 115 data, e.g., an image including the third object 230, and then provide as output an identification and/or a classification of the third object 230, as discussed above. If the sub-area 210 is occupied by a third object 230, then the process 400 continues in the block 480. If the sub-area 210 is unoccupied, then the process 400 continues in a block 490.

In the block 490, the vehicle computer 110 operates the vehicle 105 into the sub-area 210. For example, the vehicle computer 110 can determine an updated planned path $P_2$ from the location to the valid sub-area 210. The vehicle computer 110 can then actuate one or more vehicle components 125 to move the vehicle 105 along the updated planned path $P_2$ into the sub-area 210, as discussed above. The process 400 ends following the block 490.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:
   upon approaching a sub-area in an area, identify the sub-area as an authorized sub-area for a vehicle to access based on detecting a first object in the sub-area from first sensor data;
   then determine a parameter of the first object from the first sensor data;
   upon approaching the sub-area at a future time, detect a second object in the sub-area from second sensor data obtained at the future time;
   then determine a parameter of the second object based on the second sensor data; and
   determine the sub-area is valid based on determining the parameter of the second object is different than the parameter of the first object;
   wherein the sub-area is a ground surface area sized to accommodate at most one of the vehicle, the first object, or the second object at a given time.

2. The system of claim 1, wherein the instructions further include instructions to, upon determining the sub-area is valid, update a map of the area to include the valid sub-area.

3. The system of claim 1, wherein the instructions further include instructions to, upon identifying the sub-area, update a map of the area to include the authorized sub-area.

4. The system of claim 1, wherein the instructions further include instructions to, upon approaching the valid sub-area at a second future time and detecting the valid sub-area is unoccupied from third sensor data obtained at the second future time, operate the vehicle into the valid sub-area.

5. The system of claim 1, wherein the instructions further include instructions to, upon identifying the sub-area, determine a location of the vehicle and then operate the vehicle to move away from the sub-area.

6. The system of claim 5, wherein the instructions further include instructions to obtain the second sensor data based on the vehicle returning to the location at the future time.

7. The system of claim 1, wherein the instructions further include instructions to detect the sub-area based on a map of the area.

8. The system of claim 1, wherein the instructions further include instructions to detect the sub-area based on the first sensor data.

9. The system of claim 1, wherein the instructions further include instructions to prevent the vehicle from operating into an invalid sub-area.

10. The system of claim 1, wherein the instructions further include instructions to, upon identifying the first object and the second object, determine the sub-area is valid based further on the first object being different than the second object.

11. The system of claim 1, wherein each parameter is a dimension of the respective object.

12. The system of claim 1, wherein each parameter is an orientation of the respective object relative to the vehicle.

13. The system of claim 1, wherein the instructions further include instructions to determine the sub-area is valid based further on a map of the area.

14. The system of claim 1, wherein the instructions further include instructions to determine the sub-area is invalid based on determining, via the second sensor data, that the sub-area is unoccupied.

15. The system of claim 1, wherein the instructions further include instructions to identify the sub-area as unauthorized based on determining, via the first sensor data, that the sub-area is unoccupied.

16. A method, comprising:
   upon approaching a sub-area in an area, identifying the sub-area as an authorized sub-area for a vehicle to access based on detecting a first object in the sub-area from first sensor data;
   then determining a parameter of the first object from the first sensor data;
   upon approaching the sub-area at a future time, detecting a second object in the sub-area from second sensor data obtained at the future time;
   then determining a parameter of the second object based on the second sensor data; and
   determining the sub-area is valid based on determining the parameter of the second object is different than the parameter of the first object;
   wherein the sub-area is a ground surface area sized to accommodate at most one of the vehicle, the first object, or the second object at a given time.

17. The method of claim 16, further comprising, upon determining the sub-area is valid, updating a map of the area to include the valid sub-area.

18. The method of claim 16, further comprising, upon identifying the first object and the second object, determining the sub-area is valid based further on the first object being different than the second object.

19. The method of claim 16, wherein each parameter is a dimension of the respective object.

20. The method of claim 16, wherein each parameter is an orientation of the respective object relative to the vehicle.

* * * * *